Aug. 7, 1962   E. J. WINTER   3,048,032
IRRIGATION INDICATOR
Filed Feb. 11, 1959
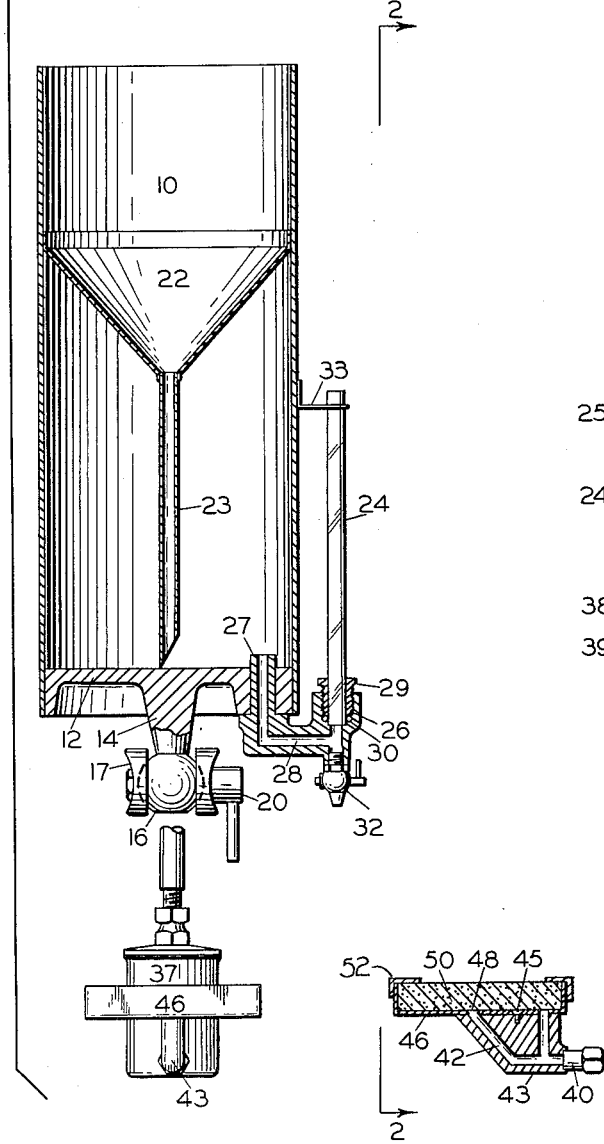
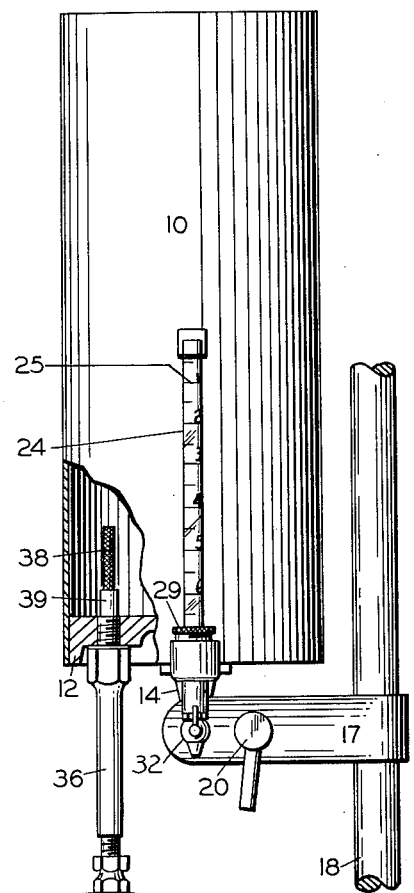
INVENTOR.
ERIC JAMES WINTER
BY Eugene M. Eckelman
ATTORNEY

United States Patent Office 3,048,032
Patented Aug. 7, 1962

3,048,032
IRRIGATION INDICATOR
Eric J. Winter, % The National Vegetable Research Station, Wellesbourne, England
Filed Feb. 11, 1959, Ser. No. 792,609
3 Claims. (Cl. 73—73)

This invention relates to a method and apparatus for indicating irrigation requirements of agricultural or other ground.

An important object of the invention is to provide a method and apparatus for indicating by a direct reading the moisture deficiency in a piece of ground to enable the appropriate irrigation to be applied thereto.

More specifically, it is an object to provide apparatus for indicating irrigation requirements for a piece of ground employing means for holding a liquid and evaporating means associated therewith which evaporates an amount of liquid from the holding means in the same proportion as a quantity of moisture is lost from said piece of ground.

Still another object is to provide a device of the type described having means for catching rainfall which is automatically compensated for in readings on a gauge.

According to the invention a method of indicating rate of moisture loss from a piece of ground consists in relating a quantity of liquid to the moisture capacity of the said piece of ground, and feeding said quantity to a porous pad located adjacent to the ground for evaporation at a rate related to the rate of moisture loss from the ground of which the moisture deficiency is to be indicated, whereby the amount of evaporation of the liquid from the pad indicates by a change of level of the quantity of liquid the required moisture deficiency.

The use of the term transpiration herein indicates the process of water movement through a plant and its loss through its leaves, the term evaporation indicates the loss of water from an inert surface, such as from the soil, and the term evapo-transpiration indicates a combination of the two.

In carrying out the invention there is provided a porous disc or pad, a water container and a float chamber, the water in the container being fed gravitationally to the float chamber and from thence to the porous pad whereby a constant level of water can be maintained in the pad as the water evaporates therethrough. As the water evaporates, the level in the container drops, giving an indication on a gauge which is calibrated and related to the size of the porous pad such that the readings are directly in terms of water deficiency in the ground, that is to say, irrigation requirements in inches of water, or transpiration or evapo-transpiration rate of growing crops thereon.

The invention will be better understood and the objects will be more evident with reference to the description in the following specification. Various changes may be made in the construction and arrangement of parts without departing from the spirit of the invention.

In the drawings:

FIGURE 1 is an elevational view partly broken away showing the present invention; and FIGURE 2 is an elevational view also partly broken away taken on the line 2—2 of FIGURE 1.

The moisture capacity of a field or other piece of ground, generally referred to as the field moisture capacity, is the amount of water present (expressed as inches of water per foot depth of soil) that a field will retain after any excess water, which would bring the soil towards a saturated condition, has drained away naturally through the force of gravity. The present invention comprises a method and apparatus for determining the amount of moisture lost from the soil so that such moisture can be replaced in the soil by irrigation and thereby maintain the desired moisture content in the soil for optimum crop growing conditions.

Referring now specifically to the drawings, the apparatus of the present invention comprises a cylindrical container or reservoir 10 closed at the bottom end by a base plate 12 having a centrally depending projection 14 in which is threadedly mounted a coupling ball 16. Ball 16 is engageable by a clamp member 17 adapted to mount the container 10 in a vertical supported position on a stake 18 in a field. Clamp 17 has a clamp bolt 20 for opening and closing it on the ball 16.

Mounted in the container 10 is a funnel-shaped rain collecting cup 22 having a central downwardly extending outlet tube 23 which terminates adjacent the bottom of the container and has an inclined outlet aperture at the bottom end. The upper end of container 10 is open whereby rainfall is adapted to collect in the cup 22 and be directed into the reservoir. The outlet tube 23 preferably extends completely to the bottom of the reservoir so that as soon as there is any water in the reservoir, the bottom of the tube is sealed from the outer atmosphere. This minimizes loss by evaporation directly from the reservoir and is very desirable when the indicator is used in hot climates.

A tubular sight gauge 24, having suitable indicia 25 thereon, is mounted on the container 10 and is supported on a bracket 26 secured to the base plate 12 and having an upwardly projecting tube portion 27 passing through the plate 12 into the interior of the container. The tube portion 27 communicates with the interior of gauge 24 by means of a passageway 28 in the bracket 26. A fluid tight supporting connection between the gauge 24 and the bracket 26 is achieved by means of a gland nut 29 and an O-ring 30. Carried on the bracket 26 is a drain cock 32 capable of draining liquid from the container 10. The upper end of gauge 24 is firmly anchored to the container by means of an angle bracket 33.

Mounted in the base 12 so as to communicate with the interior of the container is a downwardly extending tube 36 carrying at its lower end a float bowl or chamber 37. The tube 36 is connected to the base 12 by well known connecting means, and the inlet thereof is enclosed by a filter 38 which preferably is threadedly mounted in an adapter nut 39 whereby the filter may be readily unscrewed and cleaned.

Float chamber 37 has an outlet tube 40 connected to a base member 43 having a plurality of passageways 42 therein establishing communication between the tube 40 and the upper surface of the base 43. Mounted on the base 43 by means of screws 45 is a pan member 46. This pan member has a plurality of apertures 48 in its bottom wall located in predetermined positions so as to register with the openings of passageways 42 in the upper surface of base 43.

Supported in the pan 46 is an evaporation pad 50 formed of a material which may comprise a fibrous porous material, a fabric material, or other suitable material which is capable of absorbing water and presenting such water to its upper surface for evaporation. Preferably, a pad comprising an unglazed porous sintered ceramic material is used.

Operation

To set up the instrument, it is clamped to a stake in or near the crops to be irrigated. It should not be shaded from the sun or sheltered from the wind. It should be fixed so that the container is vertical and with the porous pad nearest to the sun at mid-day. Clean water, such as rain water, is poured into the container until the water in the sight glass 24 is level with the zero calibration. This level represents the moisture capacity of the soil referred to hereinbefore. If the moisture content of the soil is below field capacity the drain tap below the sight glass of the gauge should be opened to lower the water to the proper level.

With the container filled a selected amount, water therein will flow to the evaporation pad after passing through the float chamber. The water reaches the upper surface of evaporation pad 50 and evaporates at the same rate as the combined moisture evaporation from the ground and transpiration from any plants growing therein. This function is achieved by providing a container 10 of a predetermined cross-sectional area in association with an evaporation pad 50 of a predetermined surface area. Such factors are determined by experiment and calculation. That is, by careful calculation verified by empirical proof, the size of the pad can be related to the cross sectional area of the reservoir so as to be proportional to the transpiration rate of a growing crop. If the instrument is to be used with the irrigation of crops that do not fully cover the surface of the ground for which the instrument is applicable, an adjustment ring 52 may be fitted over the porous pad to reduce its effective size and thus its rate of evaporation to correspond with the lower rate of evapo-transpiration of the crop.

The float control chamber which may be of the general character employed in carburetors of internal combustion engines, insures a regular and measured flow of water to the pad as evaporation occurs therefrom, but any suitable metering device may be employed. The working level in the bowl should be such that the pad is kept saturated by capillarity, drawing up water from the pool in the bowl in which it stands. In practice, a minimum depth of water of about ⅛" has been found satisfactory, and the maximum depth must be below the rim to avoid wastage.

As the water evaporates from the pad, the level in the reservoir drops and such descent is shown on the sight glass of the gauge. Such gauge therefore shows directly the moisture deficit, or irrigation need in inches of the particular soil. Irrigation of the soil is then carried out to bring the moisture content thereof to within half an inch of its field capacity; at the same time the container is replenished by pouring water therein through the collector cup at the top, the amount poured in corresponding with the amount applied to the soil. For example if one inch has been applied through irrigation, the level in the sight glass of the gauge must also be raised one inch. The instrument adjusts itself to compensate for rainfall, since for every inch of rain that falls, the level of the container is correspondingly raised by the collection of rain in the cup.

Having now described my invention and in what manner the same may be used, I claim:

1. An irrigation indicator for designating moisture loss from soil comprising a liquid reservoir, a porous pad receiving liquid from said reservoir and having an upper surface open to atmosphere, said pad being arranged to present liquid to its said upper surface for evaporation, the rate of evaporation of the liquid from the upper surface of said pad being related to the rate of moisture loss of the soil whereby the extent of change of liquid level in said reservoir resulting from said evaporation indicates the extent of moisture deficiency of the soil, and rain catching means communicating with the interior of the reservoir for automatically raising the liquid level in said reservoir to the extent of rainfall.

2. An irrigation indicator for designating moisture loss from soil comprising a liquid reservoir, a porous pad receiving liquid from said reservoir and having an upper surface open to atmosphere, said pad being arranged to present liquid to its said upper surface for evaporation, the rate of evaporation of the liquid from the upper surface of said pad being related to the rate of moisture loss of the soil whereby the extent of change of liquid level in said reservoir resulting from said evaporation indicates the extent of moisture deficiency of the soil, and rain catching means having a delivery spout the lower end of which is arranged always to be beneath the surface of the liquid in the reservoir so as to prevent the loss of liquid by evaporation through said spout.

3. An irrigation indicator for designating moisture loss from soil comprising a liquid reservoir, a porous pad receiving liquid from said reservoir and having an upper surface open to atmosphere, said pad being arranged to present liquid to its said upper surface for evaporation, the rate of evaporation of the liquid from the upper surface of said pad being related to the rate of moisture loss of the soil whereby the extent of change of liquid level in said reservoir resulting from said evaporation indicates the extent of moisture deficiency of the soil, and metering means disposed between said reservoir and said pad to maintain the liquid at a selective level in said pad.

References Cited in the file of this patent

UNITED STATES PATENTS

| | | |
|---|---|---|
| 624,208 | Haye | May 2, 1899 |
| 1,561,285 | Sesler | Nov. 10, 1925 |
| 2,878,671 | Prosser et al. | Mar. 24, 1959 |

FOREIGN PATENTS

| | | |
|---|---|---|
| 281,169 | Switzerland | June 3, 1952 |